United States Patent Office 3,197,465
Patented July 27, 1965

3,197,465
DITHIO-BIS-AZIRIDINE AND 2-METHYL
DERIVATIVE THEREOF
Charles W. Woods, University Park, and Alexej B. Borkovec, Kensington, Md., assignors to the United States of America as represented by the Secretary of Agriculture
No Drawing. Application July 22, 1963, Ser. No. 305,907, which is a division of application Ser. No. 210,598, July 17, 1962. Divided and this application Apr. 2, 1964, Ser. No. 363,038
2 Claims. (Cl. 260—239)
(Granted under Title 35, U.S. Code (1952), sec. 266)

A non-exclusive, irrevocable, royalty-free license in the invention herein described throughout the world for all purposes of the United States Government, with the power to grant sub-licenses for such purposes, is hereby granted to the Government of the United States of America.

This application is a division of Serial No. 305,907, filed July 22, 1963, now abandoned, which is a division of Serial No. 210,598, filed July 17, 1962, which in turn is a continuation-in-part of Serial No. 103,176, filed April 14, 1961, now abandoned.

This invention relates to the use of certain synethetic organic compounds for the control or eradication of insect populations by causing sexual sterility in the insect.

It has been demonstrated that an insect population may be controlled or eradicated by the introduction of a sufficient quantity of sexually sterile insects into that population. This method was first used in the elimination of the screw-worm (*Callitroga hominovorax*, Coq.) from the island of Curacao and later from Florida and the Southeastern States. Reared flies made sexually sterile by gamma irradiation in the pupal state released in quantities estimated to be 2 to 4 times greater than the wild population caused eradication within 3 months.

The control of an insect population by chemical sterilization of the wild insects has also been reported. Here a bait containing a chemosterilant was distributed periodically in an isolated area heavily infested with house flies (*Musca domestica*, Lin.). The population was almost completely eliminated within one month.

Sterilization of insects in nature by use of gamma irradiation is not practical and its use on reared insects has been found to be expensive, dangerous, and troublesome. The same effect can be more easily obtained by incorporating the proper chemosterilant in a food or bait. Topical application by spray or dip is still another possible means of administering the material.

Therefore an object of this invention is to provide a material that will cause the sexual sterility of a wild insect when properly administered to it.

Another object of this invention is to provide a material which will cause sexual sterility when fed or applied to reared insects and thus eliminate the need for dangerous and expensive ionizing radiation.

In general according to this invention certain sulfur containing derivatives of aziridine have been found to cause sexual sterility when incorporated in the food of the screw-worm fly, house fly, and the Mexican fruit fly (*Anestrepha ludens*, Loew). These compounds may be represented by the following structural formulae in which R is either hydrogen or an alkyl group.

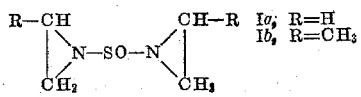

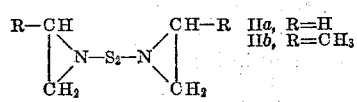

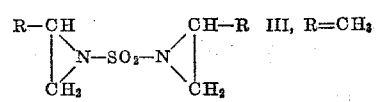

Compounds Ia, Ib, IIa, and IIb can be prepared from thionyl chloride or sulfur monochloride and the appropriate aziridine in an inert solvent in the presence of a tertiary amine. 1,1'-sulfonylbis [2-methylaziridine] (III) was prepared by oxidation of 1,1'-sulfinylbis [2-methylaziridine] (IIb).

The invention is specifically illustrated in the following examples:

*Example 1.—Preparation of 1,1'-sulfinyldiaziridine (Ia)*

To a solution of 51.6 g. (1.20 moles) of ethylenimine and 106 g. (1.05 moles) of triethylamine in 500 ml. of dry benzene was added drop-wise 59.6 g. (0.50 mole) of thionyl chloride in 300 ml. of benzene. The reaction mixture was stirred and kept at 5° C. during the addition. After standing 20 hours, the precipitate was collected by filtration and filtrate distilled. The yield of 1,1'-sulfinyldiaziridine boiling 49–53° C. (0.1 mm.) was 32 g.; $n_D^{25}$ 1.5130.

1,1'-sulfinylbis(2-methylaziridine) (Ia), also prepared by this method from the corresponding 2-ethylenimine, boiled at 52–56° C. (.1 mm.); $n_D^{25}$ 1.4854; density 1.0924.

*Example 2.—Preparation of 1,1'-dithiodiaziridine (IIa)*

A solution of 67.5 g. (0.50 mole) of sulfur monochloride in 200 ml. of dry benzene was added drop-wise to a cooled and stirred solution of 47.4 g. (1.10 moles) of ethylenimine and 111 g. (1.10 moles) of triethylamine in 800 ml. of dry benzene. The temperature was maintained at 5° C. during the addition and at 25° C. for 20 hours. After filtration the solution was distilled to give 44 g. of 1,1'-dithiodiaziridine boiling 44–46° C. (0.03 mm.); $n_D^{25}$ 1.5776.

1,1'-dithiobis(2-methylaziridine) (IIb) also prepared by this method from the corresponding 2-ethylenimine, boiled 52–56° C. (0.2 mm.); $n_D^{25}$ 1.5368.

*Example 3.—Preparation of 1,1'-sulfonylbis(2-methylaziridine) (III)*

To 35 g. (0.22 mole) of 1,1'-sulfinylbis(2-methylaziridine) (IIb) dissolved in 1 liter of acetone was added 38 g. of finely ground potassium permanganate in 4 g. portions. The permanganate color was not discharged after the last addition and the precipitated manganese dioxide was removed by filtration. Vacuum distillation of the filtrate gave 22 g. of 1,1′-sulfonylbis(2-methylaziridine) boiling 77–82° C. (0.15 mm.); $n_D^{25}$ 1.4700.

*Example 4*

These compounds were tested against the house fly, Mexican fruit fly, and screw-worm in the following procedures:

The normal food for rearing house flies was made up of six parts of sugar, six parts of nonfat dry milk, and one part powdered egg. The candidate chemosterilant was incorporated in this mixture and fed to newly emerged flies. After seven days Chemical Specialties Manufacturers Association standard medium was placed in the cage for oviposition and inspected daily or until the flies were dead. Viability of the eggs was determined by inspection of the medium two days after oviposition for growing larvae.

The Mexican fruit fly was fed a mixture of three parts of granulated sugar and one part orange juice crystals and some protein hydrolyzate in a separate container. This food combined with the test compound was provided to the fruit flies from the day of adult emergence. The flies were egged a few days after sexual maturity and twice thereafter at weekly intervals using oviposition shells placed in the cages for two hours late in the morning. The eggs were counted, incubated on blotting paper, and the emerging larvae counted to determine hatch.

Screw-worm flies less than 24 hours old were fed a mixture of the chemosterilant fixed with honey. Freshly prepared food was offered daily for eight days when the females were removed to oviposit. Females were placed in small vials with a small quantity of ground beef as an oviposition medium. After oviposition was completed the eggs were transferred to damp paper and incubated for 24 hours to determine viability.

The following results were obtained:

|  | Percent hatch | | |
| --- | --- | --- | --- |
|  | Screw-worm fly | House fly | Mexican fruit fly |
| Feeding level | 1% | 1% | 2% |
| Compound: | | | |
| 1,1′-Sulfinyldiaziridine | No eggs | 20 | 0 |
| 1,1′-Sulfinylbis[2-methylaziridine] | 2 | 12 | 8 |
| 1,1′-Sulfonylbis[2-methylaziridine] | [1] 0 | toxic | toxic |
| 1,1′-Dithiodiaziridine | 0 | 8 | 100 |
| 1,1′-Dithiobis[2-methylaziridine] | toxic | 65 | 85 |

[1] 0.5% feeding level.

The examples given above in which the reproductive capacity of the insects was depressed by feeding the material to the adult insect are intended to be illustrative rather than limiting. Other methods of administering the material such as spraying, dipping, or injecting which are well known to the art of insect control can also be used. Also the chemicals may also be applied to other stages of the insect growth, such as the larval or pupal stage.

Thus having described our invention, we claim:
1. 1,1′-dithiodiaziridine.
2. 1,1′-dithiobis(2-methylaziridine).

References Cited in the file of this patent
UNITED STATES PATENTS

| 2,917,492 | 12/59 | Reeves et al. | 260—239 |
| 2,943,976 | 7/60 | Goodhue et al. | 167—33 |
| 3,006,912 | 10/61 | Vierling et al. | 260—239 |
| 3,012,935 | 12/61 | Goodhue | 167—33 |
| 3,014,902 | 12/61 | Nakabayashi | 260—239 |

NICHOLAS S. RIZZO, *Primary Examiner.*